(12) United States Patent
Chen et al.

(10) Patent No.: US 7,387,987 B2
(45) Date of Patent: *Jun. 17, 2008

(54) RHEOLOGY MODIFIERS

(75) Inventors: Yiyan Chen, Richmond, TX (US); Jesse C. Lee, Paris (FR); Mathew Samuel, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/279,612

(22) Filed: Apr. 13, 2006

(65) Prior Publication Data

US 2006/0185842 A1     Aug. 24, 2006

Related U.S. Application Data (63) Continuation-in-part of application No. 11/334,158, filed on Jan. 17, 2006, which is a continuation-in-part of application No. 11/249,233, filed on Oct. 13, 2005, which is a continuation-in-part of application No. 11/012,446, filed on Dec. 15, 2004, application No. 11/279,612, which is a continuation-in-part of application No. 10/325,226, filed on Dec. 19, 2002, now Pat. No. 7,084,095, and a continuation-in-part of application No. 11/033,651, filed on Jan. 12, 2005, now Pat. No. 7,320,952.

(60) Provisional application No. 60/538,025, filed on Jan. 21, 2004.

(51) Int. Cl.
*C09K 8/584* (2006.01)
*C09K 8/588* (2006.01)
*E21B 21/00* (2006.01)

(52) U.S. Cl. .................. 507/261; 507/136; 507/260; 507/266; 166/308.2

(58) Field of Classification Search ............... 507/261
See application file for complete search history.

(56) References Cited

U.S. PATENT DOCUMENTS

| | | | |
|---|---|---|---|
| 2,614,982 A | 10/1952 | Caldwell | |
| 2,614,983 A | 10/1952 | Caldwell | |
| 2,722,099 A | 11/1955 | Wasserbach | |
| 3,223,622 A * | 12/1965 | Lummus et al. | ............ 507/131 |
| 3,302,711 A | 2/1967 | Dilgren | |
| 3,880,764 A | 4/1975 | Donham | |
| 4,284,414 A | 8/1981 | Bryant | |

(Continued)

FOREIGN PATENT DOCUMENTS

WO          9856497          12/1998

(Continued)

*Primary Examiner*—Randy Gulakowski
*Assistant Examiner*—John J. Figueroa
(74) *Attorney, Agent, or Firm*—David Cate; Darla Fonseca; Robin Nava (57) ABSTRACT

A method for increasing the rate of shear rehealing of fluids made with cationic, zwitterionic, and amphoteric viscoelastic surfactant fluid systems by adding an effective amount of a polymeric rheology enhancer selected from polypropylene glycols and block copolymers of polypropylene glycol and polyethylene glycol. For applications in which rapid shear rehealing is required, the rheology enhancer allows fluids to be made and used at lower viscoelastic surfactant concentrations. Preferred surfactants are betaines and quaternary amines. The fluids are useful in oilfield treatments, for example fracturing and gravel packing.

32 Claims, 5 Drawing Sheets

U.S. PATENT DOCUMENTS

| | | |
|---|---|---|
| 4,464,182 A | 8/1984 | Tack |
| 4,466,486 A * | 8/1984 | Walker ................. 166/301 |
| 4,528,105 A * | 7/1985 | Ito et al. ................. 507/218 |
| 4,664,818 A | 5/1987 | Halliday |
| 4,836,282 A * | 6/1989 | Hsieh ................. 166/270.1 |
| 5,013,462 A * | 5/1991 | Danley ................. 507/243 |
| 5,120,708 A * | 6/1992 | Melear et al. ............. 507/126 |
| 5,124,059 A | 6/1992 | Koch |
| 5,167,281 A | 12/1992 | Kalfoglou |
| 5,617,920 A | 4/1997 | Dovan |
| 5,979,557 A | 11/1999 | Card et al. |
| 6,051,562 A * | 4/2000 | Chamberlain et al. ........ 514/89 |
| 6,063,737 A | 5/2000 | Haberman |
| 6,133,204 A | 10/2000 | Newhouse |
| 6,187,065 B1 | 2/2001 | Jackson |
| 6,258,859 B1 | 7/2001 | Dahayanake et al. |
| 6,348,436 B1 | 2/2002 | Langlois |
| 6,432,885 B1 * | 8/2002 | Vollmer ................. 507/236 |
| 6,435,277 B1 | 8/2002 | Qu et al. |
| 6,605,570 B2 | 8/2003 | Miller |
| 6,703,352 B2 | 3/2004 | Dahayanake et al. |
| 6,770,601 B1 * | 8/2004 | Brookey ................. 507/102 |
| 6,908,888 B2 | 6/2005 | Lee et al. |
| 2002/0147114 A1 | 10/2002 | Dobson, Sr. et al. |
| 2003/0134751 A1 | 7/2003 | Lee et al. |
| 2005/0067165 A1 | 3/2005 | Cawiezel et al. |
| 2005/0137095 A1 | 6/2005 | Cawiezel et al. |
| 2005/0155762 A1 | 7/2005 | Chen et al. |
| 2006/0025321 A1 | 2/2006 | Treybig et al. |
| 2006/0111248 A1 | 5/2006 | Lee et al. |
| 2006/0128597 A1 | 6/2006 | Chen et al. |
| 2006/0148660 A1 | 7/2006 | Chen et al. |

FOREIGN PATENT DOCUMENTS

| | | |
|---|---|---|
| WO | WO 9856497 A1 * | 12/1998 |
| WO | WO 9932572 A1 * | 7/1999 |
| WO | 2004057155 A1 | 7/2004 |
| WO | 2006059257 A2 | 6/2006 |

* cited by examiner

RHEOLOGY MODIFIERS

CROSS REFERENCE TO RELATED APPLICATIONS

This application is a Continuation in Part of prior copending application Ser. No. 11/334,158 entitled "Foamed Viscoelastic Surfactants," filed Jan. 17, 2006, which is a Continuation in Part of copending application Ser. No. 11/249,233, filed Oct. 13, 2005, entitled "Viscoelastic Surfactant Rheology Modification," which is a Continuation in Part of prior copending application Ser. No. 11/012,446, filed Dec. 15, 2004, entitled "Viscoelastic Surfactant Rheology Modification". This application is also a Continuation in Part of application Ser. No. 10/325,226, filed Dec. 19, 2002, now U.S. Pat. No. 7,084,095 entitled "Methods for Controlling the Rheological Properties of Viscoelastic Surfactants Based Fluids". This application is also a Continuation in Part of prior application Ser. No. 11/033,651, filed Jan. 12, 2005, now U.S. Pat. No. 7,320,952 entitled "Additive for Viscoelastic Fluid," which claimed the benefit of U.S. Provisional Application No. 60/538,025, filed Jan. 21, 2004. This application is related to a U.S. patent application entitled "Rheology Enhancers," filed Apr. 13, 2006, inventors Yiyan Chen, et al.

BACKGROUND OF THE INVENTION

The invention relates to viscoelastic surfactant fluid systems (VES's). More particularly it relates to additives for viscoelastic surfactant fluid systems that increase their stability at selected temperatures and shorten the time they take to heal after shearing.

Certain surfactants, when in aqueous solution, form viscoelastic fluids. Such surfactants are termed "viscoelastic surfactants", or "VES's". Other components, such as additional VES's, co-surfactants, buffers, acids, solvents, and salts, are optional or necessary (depending upon the specific VES fluid system and the intended use) and perform such functions as increasing the stability (especially thermal stability) or increasing the viscosity of the systems by modifying and/or stabilizing the micelles; all the components together are called a viscoelastic surfactant system or viscoelastic fluid system. Not to be limited by theory, but many viscoelastic surfactant systems form long rod-like or worm-like micelles in aqueous solution. Entanglement of these micelle structures gives viscosity and elasticity to the fluid. For a fluid to have good viscosity and elasticity under given conditions, proper micelles must be formed and proper entanglement is needed. This requires the surfactant's structure to satisfy certain geometric requirements and the micelles to have sufficient length or interconnections for adequate entanglements.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, rheology modifiers, or rheology enhancers, etc.; they typically are alcohols, organic acids such as carboxylic acids and sufonic acids, sulfonates, and others. We shall use the term rheology enhancers here. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others.

In particular, many VES fluid systems exhibit long viscosity recovery times after experiencing prolonged high shear. Slow recovery negatively impacts drag reduction and proppant transport capability, which consequently leads to undesirably high treating pressures and risks of near wellbore screen-outs. Slow recovery of viscosity after shear also means that higher concentrations of viscoelastic surfactants must be used. One way that the expense of higher viscoelastic surfactant concentrations can be offset is to use shear recovery enhancers and/or shear rehealing accelerators that allow the use of lower viscoelastic surfactant concentrations.

SUMMARY OF THE INVENTION

A first embodiment of the invention is an oilfield treatment method including the steps of a) providing a fluid containing a viscoelastic surfactant selected from zwitterionic, amphoteric, and cationic surfactants and mixtures of these surfactants, b) adding a rheology enhancer to the fluid in a concentration sufficient to decrease the shear rehealing time of the fluid, and c) injecting the fluid down a well. The rheology enhancer is selected from polypropylene glycols and block copolymers of polypropylene glycol and polyethylene glycol.

In another embodiment, the rheology enhancer increases the viscosity of the fluid.

In yet another embodiment, the viscoelastic surfactant includes a zwitterionic surfactant that includes a surfactant or mixture of surfactants having the formula:

in which R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$. The zwitterionic surfactant may have the betaine structure:

in which R is a hydrocarbon group that may be branched or straight chained, aromatic, aliphatic or olefinic and has from about 14 to about 26 carbon atoms and may contain an amine; n=about 2 to about 4; and p=1 to about 5. The zwitterionic surfactant may also be a mixture of these compounds. The betaine contains for example oleylamidopropyl betaine, or betaine erucylamidopropyl betaine. The fluid may also contain a co-surfactant.

In yet another embodiment, the viscoelastic surfactant includes a zwitterionic surfactant that includes a surfactant or mixture of surfactants having the formula:

in which $R_1$ has from about 14 to about 26 carbon atoms and may be branched or straight chained, saturated or unsaturated, and may include a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds.

In a further embodiment, the cationic surfactant, $R_1$ contains from about 18 to about 22 carbon atoms and may contain a carbonyl, an amide, or an amine; $R_2$, $R_3$, and $R_4$ contain from 1 to about 3 carbon atoms, and $X^-$ is a halide. For example, $R_1$ includes from about 18 to about 22 carbon atoms and may include a carbonyl, an amide, or an amine, and $R_2$, $R_3$, and $R_4$ are the same as one another and include from 1 to about 3 carbon atoms.

In yet a further embodiment, the fluid further contains a member selected from amines, alcohols, glycols, organic salts, chelating agents, solvents, mutual solvents, organic acids, organic acid salts, inorganic salts, oligomers, and mixtures of these members. The member is present, for example, at a concentration of between about 0.01 and about 10 percent, for example at a concentration of between about 0.01 and about 1 percent.

In yet another embodiment, the viscoelastic surfactant includes a surfactant or mixture of surfactants containing and amphoteric surfactant containing an amine oxide, for example an amidoamine oxide.

In other embodiments, the rheology enhancer polymer is present in the fluid at a concentration of from about 0.005% to about 1 weight %, for example at a concentration of from about 0.01 weight % to about 0.05 weight %. The rheology enhancer may contain a polypropylene glycol. The polypropylene glycol may have a molecular weight of from about 2000 to about 100000 and may be present at a concentration of from about 0.005 weight % to about 1 weight % of the concentration of the active viscoelastic surfactant, for example at a concentration of from about 0.01 weight % to about 0.5 weight % of the concentration of the active viscoelastic surfactant.

In another embodiment, the rheology enhancer is selected from block copolymers having the structure PPG-PEG-PPG, PEG-PPG-PEG, and PPG-PEG, in which PPG is polypropylene glycol and PEG is polyethylene glycol. The number of monomeric units in each PPG block is, for example, from about 3 to about 1000 and the number of monomeric units in each PEG block is, for example, from about 3 to about 1000. The number of monomeric units in each PPG block is, for example, from about 8 to about 24 and the number of monomeric units in each PEG block is, for example from about 4 to about 12. The ratio of PPG repeating units to PEG repeating units is, for example, from about 1 to about 2. The block copolymer is present at a concentration of from about 0.05 weight % to about 20 weight % of the concentration of the active viscoelastic surfactant, for example at a concentration of from about 0.1 weight % to about 10 weight % of the concentration of the active viscoelastic surfactant. The block copolymer has a molecular weight, for example, of from about 1000 to about 18,000, for example a molecular weight of from about 2000 to about 4000. The block copolymers have terminal groups selected from hydrogen, hydroxyl, and alkyl in which the alkyl groups may be linear or branched, and may be saturated or unsaturated, and may contain from one to about 12, preferably from one to about 4 carbon atoms. These terminal groups may be the same or different.

In other embodiments, the fluid may contain an acid selected from hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and mixtures of these acids.

In other embodiments, the rheology enhancer has a structure selected from star, comb, dendritic, brush, graft, and star-branched.

Yet another embodiment is a method of increasing the rate of shear rehealing of a viscoelastic fluid made with a viscoelastic surfactant including the steps of a) providing a fluid containing a viscoelastic surfactant selected from zwitterionic, amphoteric, and cationic surfactants and mixtures of these surfactants, and b) adding to the fluid a rheology enhancer in a concentration sufficient to increase the rate of shear rehealing of the fluid, the rheology enhancer being selected from polypropylene glycols and block copolymers of polypropylene glycol and polyethylene glycol.

Yet another embodiment is the use of these fluids when foamed.

Yet another embodiment is a method of using the fluids described above in oilfield treatments, for example drilling, completion, and stimulation. Fluids in accordance with the invention may be used as additives to modify the rheology of oilfield treatment fluids so as to facilitate the use of these fluids for injection or removal from wellbores and formations.

DETAILED DESCRIPTION OF THE INVENTION

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree and rate of viscosity-recovery or re-healing when the fluid is subjected to high shear and the shear is then reduced. For VES fluids, shear may disrupt the micelle structure, after which the structure reforms. Controlling the degree and rate of reassembling (re-healing) is necessary to maximize performance of the surfactant system for various applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus, the regained viscosity ensures that the solids are effectively transported to the surface.

Viscoelastic surfactant fluid systems have been shown to have excellent rheological properties for hydraulic fracturing applications; however, shear recovery time, not fluid viscosity, often dictates the selection of a specific surfactant for a specific application. Furthermore, a fluid made with a certain concentration of surfactant may show adequate viscosity for fracturing at a given temperature, but the minimal usable concentration may be high due to slow shear recovery with a lower concentration. An acceptable shear recovery time is considered to be less than 15 seconds. A shear recovery time of less than 10 seconds is even better. A time longer than 15 seconds will negatively impact drag reduction and proppant transport from the perforations to the fracture. Shortening the viscosity-recovery time makes it possible to use VES fluid systems that would otherwise not be suitable in many applications. In addition, when a rheology modifier also increases fluid viscosity, then less surfactant is needed to provide a given viscosity. Examples of rheology enhancers are given in U.S. patent application Ser. No. 10/994,664 which is assigned to the same assignee as the present invention and which is hereby incorporated in its entirety.

We have previously found that certain simple additives, when included in certain viscoelastic surfactant fluid systems (such as cationic, amphoteric, and zwitterionic viscoelastic surfactant fluid systems, especially betaine viscoelastic surfactant fluid systems), in the proper concentration relative to the surfactant active ingredient, significantly shorten the shear recovery time of the systems, increasing the viscosity at the same time. In many cases, the shear recovery is very fast.

We have now identified a class of chemical additives that are effective for shortening the rehealing time of VES systems after high shear, and increasing the viscosity of VES systems at a given temperature, making the fluids more useful for many purposes, such as, but not limited to, uses as oilfield treatment fluids, especially stimulation fluids, most especially hydraulic fracturing fluids. We call these materials "rheology enhancers" here. The rheology enhancers extend the shear conditions under which the VES systems can be used, and reduce the amount of surfactant needed, which in turn reduces the cost and improves cleanup. At some temperatures, these rheology enhancers increase viscoelastic surfactant fluid viscosities, although if the hydrophobic character of the rheology enhancers is too high, they cause some decrease in viscosity, especially at low shear and high temperature; under all conditions, they greatly decrease viscoelastic surfactant fluid high shear recovery times. In many cases, these additives minimize the tendency of viscoelastic surfactant fluid systems to make foams. However, some of these block copolymers are known to promote foaming, and some are known to promote defoaming. Suitable block copolymers may be chosen with these functions in mind.

These rheology enhancers are polypropylene glycols and block copolymers of polypropylene glycol with polyethylene glycol. These rheology enhancers were briefly mentioned in U.S. Patent Application Publication No. 2003/0134751, which is assigned to the assignee of the present invention and is hereby incorporated in its entirety.

Suitable rheology enhancers of the invention include, for example, block copolymers of polyethylene glycol (which will be abbreviated PEG) and polypropylene glycol (which will be abbreviated (PPG). (Note that polyethylene glycol is also known as polyethylene oxide and polypropylene glycol is also known as polypropylene oxide, poly(1,2-epoxypropane), and poly(1,2-propanediol), among other names.) The PEG and PPG blocks are connected by ether linkages (with the oxygen coming from the end PEG or PPG of one of the blocks) and terminate with —OH groups (with the oxygen coming from the end PEG or PPG of one of the blocks). The block copolymers may be of the structure PPG-PEG-PPG, PEG-PPG-PEG, or PPG-PEG, where it is understood that PPG-PEG-PPG for example is shorthand for:

HO-(PO)$_x$-(EO)$_y$-(PO)$_z$-OH where PO is propylene oxide and EO is ethylene oxide. Typically, x=z, and x is from 3 to about 1000 and y is from 3 to about 1000. These polymers may be linear, or the overall polymer or individual blocks may be branched, or may have a comb, dendritic, brush, graft, star or star-branched shape. The linear polymers are preferred. The overall polymers or the individual blocks may contain other monomers or polymers such as vinyl esters, vinyl acrylates, and the corresponding hydrolyzed groups, and if so they may be random, alternating, or block copolymers. When they contain other polymers, the amount must be sufficiently small that the hydrophobicity or hydrophilicity of each part of the polymer is not affected enough to excessively decrease the effectiveness of the polymer. Also effective are PPG polymers, optionally containing small amounts of ethylene oxide units, as is commonly found in manufacture when great care is not taken to purify the propylene oxide starting material. Example PPG's are PURACOL POLYOL 1044™ available from BASF Corporation, Florham Park, N.J., U.S.A., and POLYGLYCOL P-4000™ available from Dow Chemical Company, Midland, Mich., U.S.A. These materials have average molecular weights of about 4000 and contain little or no EO and so are quite hydrophobic. It has been found that PPG's having molecular weights ranging from 1000 up to about 100,000 are suitable in the invention, but molecular weights below about 25000 are preferred, and molecular weights of about 4000 are most preferred for zwitterionic surfactants, such as betaines, such as BET-E-40 (see below).

Examples of these block copolymers having PEG cores having symmetrical PPG blocks on either end include the symmetric block copolymers ANTAROX™ 17-R-2 and ANTAROX™ 31-R-1, available from Rhodia, Inc., Cranbury, N.J., U.S.A. In this terminology, the first number is an arbitrary code number based on the average numerical values of x and y, the letter R indicates that the central block is PEG, and the second number indicates the approximate average mole ratio of PO:EO monomer units. Thus ANTAROX™ 17-R-2 is HO-(PO)$_x$-(EO)$_y$-(PO)$_z$-OH in which x=12 and y=9, and in ANTAROX™ 31-R-1, x=21 and y=7; the molecular weights of these examples are less than 3000. Preferred molecular weights range from about 1000 to about 18,000. These materials are also known as "Meroxapol's". The corresponding materials having a PPG core and two symmetrical PEG blocks are known as Poloxamer's". Examples of these block copolymers are also sold by BASF under the name PLURONIC™ (with different rules for the codes in the names) with approximately 10 to 80% polyoxyethylene, and average molecular weights ranging from about 1100 to about 17,400. We have shown the structures of these polymers as having hydroxyl groups at both ends, which would be the case if they are manufactured by certain methods. If they are manufactured by other methods, then one termination could be hydroxyl and one could be hydrogen, or both could be hydrogen. It is to be understood that when we show any one such structure, we intend it to represent one having any combination of —OH and —H terminal groups. Also, the block copolymers or polypropylene glycols may have saturated or unsaturated, linear or branched, alkyl groups, having from one to about 12, preferably from one to about 4, carbon atoms, at either or both ends. Some of these block copolymers are known to promote foaming, and some are known to promote defoaming. Suitable block copolymers may be chosen with these functions in mind.

Suitable concentrations of the rheology enhancers are from about 0.005 weight % to about 1 weight %, for example from about 0.01 weight % to about 0.5 weight % (of the as received material in the final fluid). Suitable concentrations of the rheology enhancers are from about 0.05% to about 20% of the concentration of active viscoelastic surfactant, for example from about 0.1% to about 10%.

The rheology enhancers of the present invention give the desired results with cationic, amphoteric, and zwitterionic viscoelastic surfactant systems. They have been found to be particularly effective with certain zwitterionic surfactants. In general, particularly suitable zwitterionic surfactants have the formula:

RCONH—(CH$_2$)$_a$(CH$_2$CH$_2$O)$_m$(CH$_2$)$_b$—N$^+$(CH$_3$)$_2$—(CH$_2$)$_{a'}$(CH$_2$CH$_2$O)$_{m'}$(CH$_2$)$_{b'}$COO$^-$ in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and CH$_2$CH$_2$O may also be OCH$_2$CH$_2$.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a C$_{17}$H$_{33}$ alkene tail group) and contains about 30% active surfactant; the remainder is substantially water, sodium chloride, and propylene glycol. An analogous material, BET-E-40, is also available from Rhodia and contains an erucic acid amide group (including a C$_{21}$H$_{41}$ alkene tail group) and is approximately 40% active ingredient, with the remainder being substantially water, sodium chloride, and isopropanol. The surfactant in BET-E-40 is also shown below; one chemical name is erucylamidopropyl betaine. As-received concentrate of BET-E-40 was used in the experiments reported below, where it will be referred to as "VES". BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30 weight % of the liquid portion of the system. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

Surfactant in BET-O-30 (when n=3 and p=1)

Surfactant in BET-E-40 (when n=3 and p=1)

SDBS (when x=11 and the Counterion is Na$^+$)

Preferred embodiments of the present invention use betaines; most preferred embodiments use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 5 weight %, preferably from about 1 to about 2.5 weight % (concentration of as-received viscoelastic surfactant concentrate in the final fluid).

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members.

Another suitable cationic VES is erucyl bis(2-hydroxyethyl)methyl ammonium chloride, also known as (Z)-13 docosenyl-N-N-bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl)rapeseed ammonium chloride; oleyl methyl bis(hydroxyethyl)ammonium chloride; erucylamidopropyltrimethylamine chloride, octadecyl methyl bis(hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl)ammonium 3,4-dichlorobenzoate; cetyl tris(hydroxyethyl) ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris(hydroxyethyl)ammonium bromide; hexadecyl ethyl bis(hydroxyethyl)ammonium chloride; hexadecyl isopropyl bis (hydroxyethyl)ammonium iodide; and cetylamino, N-octadecyl pyridinium chloride.

Many fluids made with viscoelastic surfactant systems, for example those containing cationic surfactants having structures similar to that of erucyl bis(2-hydroxyethyl)methyl ammonium chloride, inherently have short re-heal times and the rheology enhancers of the present invention may not be needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Patent Application Nos. 2002/0147114, 2005/0067165, and 2005/0137095, for example amidoamine oxides. These four references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide (these are weight percents of a concentrate used to make the final fluid).

Viscoelastic surfactant fluids, for example those used in the oilfield, may also contain agents that dissolve minerals and compounds, for example in formations, scale, and filtercakes. Such agents may be, for example, hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, and salts of hexafluoroantimony. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5 weight % (of active ingredient in the liquid phase). When VES fluids contain strong acids, they are typically not gelled and display low viscosity; when the pH increases as the acid reacts with the mineral, the system gels and the viscosity increases. Such a fluid may be called a viscoelastic diverting acid. Schlumberger Technology Corporation markets viscoelastic diverting agents under the trademark VDA®, a registered trademark of Schlumberger Technology Corporation. The rheology enhancers of the present invention may be used in viscoelastic surfactant fluid systems containing acids and chelating agents.

Preparation and use (mixing, storing, pumping, etc.) of the viscoelastic surfactant fluid systems containing rheology enhancers of the invention are the same as for such fluids without the rheology enhancers. For example, the order of mixing of the components in the liquid phase is not affected by including these rheology enhancers. Optionally, the rheology enhancers may be incorporated in surfactant concentrates (provided that they do not affect component solubilities or concentrate freezing points) so that the concentrates can be diluted with an aqueous fluid to make VES systems. This maintains the operational simplicity of the VES systems. Alternatively, the rheology enhancers may be provided as separate concentrates in solvents such as water, isopropanol, and mixtures of these or other solvents. The active rheology enhancer in such concentrates is, for example, from about 10 to about 50% by weight, for example from about 10 to about 40 weight %. As is normally the case in fluid formulation, laboratory tests should be run to ensure that the additives do not affect, and are not affected by, other components in the fluid (such as salts, for example). In particular, the rheology enhancers of the present invention may be used with other rheology modifiers. Adjusting the concentrations of surfactant, rheology enhancer, and other fluid components to account for the effects of other components is within the scope of the invention.

The fluid may be used, for example in oilfield treatments. As examples, the fluid may be used as a pad fluid and/or as a carrier fluid and/or as a diverter and/or as a leakoff control system in hydraulic fracturing or acid fracturing, as a carrier fluid for lost circulation control agents, as a carrier fluid for gravel packing, and as a diverter or a main fluid in acidizing and acid fracturing. The fluids may also be used in other industries, such as in household and industrial cleaners, agricultural chemicals, personal hygiene products, and in other fields.

The optimal concentration of a given rheology enhancing additive of the invention for a given choice of VES surfactant fluid system at a given concentration and temperature, and with given other materials present, can be determined by simple experiments. The total viscoelastic surfactant concentration must be sufficient to form a stable fluid under conditions (time and temperature) at which the system will be used. The appropriate amounts of surfactant and rheology enhancer are those necessary to achieve the desired fluid stability and shear recovery time as determined by experiment. Again, tolerance for, and optimal amounts of other additives may also be determined by simple experiment. In general, the amount of surfactant (as-received viscoelastic surfactant concentrate in the final fluid) is from about 0.5 to about 15 weight %, preferably from about 1 to about 10 weight %. Commercially available surfactant concentrates may contain some materials that are themselves rheology enhancers, although they may be present for example for concentrate freezing point depression, so the amount of surfactant and rheology enhancer used is determined for the specific concentrate used. Mixtures of surfactants and/or mixtures of rheology enhancers (including mixtures of more than one rheology enhancer of the invention, and mixtures of one or more rheology enhancers of the invention with one or more other rheology enhancers) may be used. Mixtures of surfactants may include surfactants that are not viscoelastic surfactants when not part of a viscoelastic surfactant system. All mixtures are tested and optimized; for example, too much total rheology enhancer may decrease the beneficial effects.

EXPERIMENTAL

The present invention can be further understood from the following examples. In the examples, the zwitterionic surfactant concentrate BET-E-40 is called "VES" and is about 40% active surfactant as received. As-received ANTAROX 17-R-2 is called "A-17" and as-received ANTAROX™ 31-R-1 is called "A-31". PPG is a polypropylene glycol called POLYGLYCOL P-4000™ available from Dow Chemical. D-17 is DAXAD™ 17 which is a polynaphthalene sulfonate available from GEO Specialty Chemicals, Cleveland, Ohio, U.S.A; this material is available as a liquid concentrate and as a solid and may also contain small amounts of sodium formate, sodium 2-naphthalenesulfonic acid, water, and sodium sulfate. Concentrations given in the examples are all weight % of the as-received materials in the final fluid, except the concentrations of DAXAD™ 17 are given in weight percent of the polymer itself, and the concentration of PPG which is given in volume %.

Example 1

Figure 1:
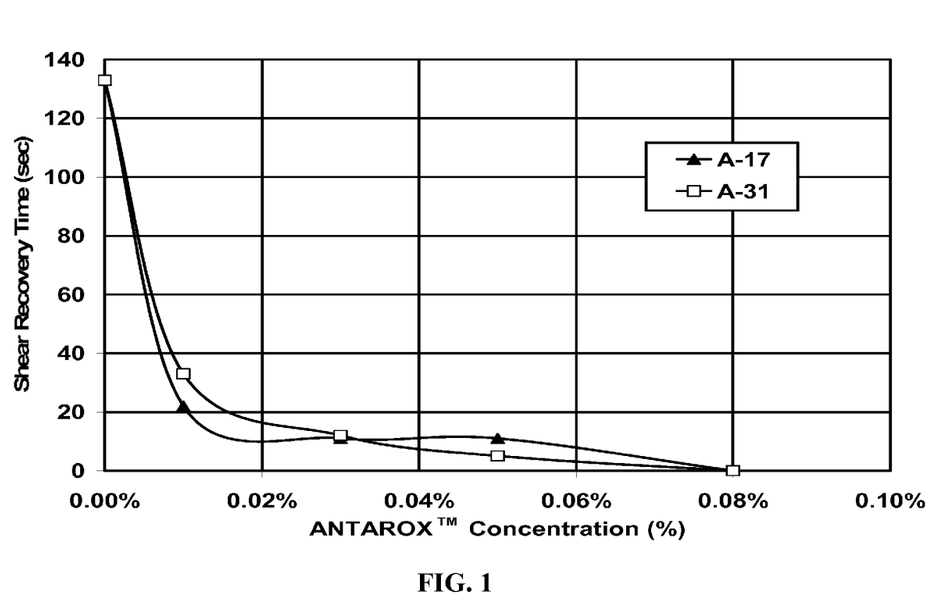
FIG. 1 shows the shear recovery times of a fluid system containing a zwitterionic viscoelastic surfactant and varying concentrations of two rheology enhancers of the invention.

Shear recovery times were determined. In these experiments, approximately 200 mL of already-mixed VES fluid containing the additive was sheared at no less than 10,000 rpm for no less than 30 seconds and no more than 1 minute in a 1 L Waring blender. The shearing was stopped and timing was begun. The fluid was poured back and forth between a beaker and the blender cup and the fluid recovery was characterized by two times, referred to as the initial and final recovery times; both were estimated by visual observation. The initial fluid recovery time was the time at which fluid "balling" occurred (when the fluid showed the first signs of elasticity as indicated by the fluid taking a longer time to achieve a flat surface in the receiving beaker when poured). The final fluid recovery time was the time at which fluid "lipping" occurred. The fluid "lips" when inclining the upper beaker or cup containing the fluid does not result in fluid flow into the container below, but rather the formation of a "lip," and pulling the upper container back to a vertical position pulls the "lip" back into the upper container. In fracturing fluid practice, "lipping" is used to estimate when the fluid reaches its near-equilibrium elasticity. FIG. 1 shows the final shear recovery times of fluids containing 3 weight % VES concentrate and varying concentrations of A-17 and A-31. Remember that the target shear recovery time is about 10 seconds; it can be seen that each additive achieved this target at a concentration of no more than about 0.03 weight % of the fluid. The maximum amount of additive used in the experiments of example 1 (0.08 wt % of the fluid) was about 6.7% of the weight of surfactant (there was 3 wt % in the fluid of a concentrate containing about 40% active surfactant).

Example 2

Figure 2:
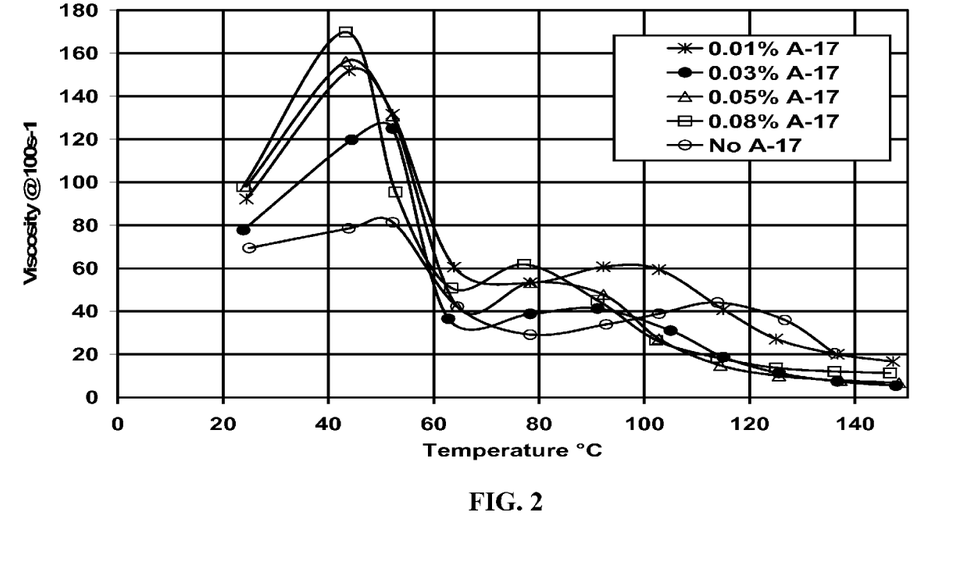
FIG. 2 shows the viscosity of a fluid containing a zwitterionic viscoelastic surfactant and varying concentrations of one rheology enhancer of the invention.
Figure 3:
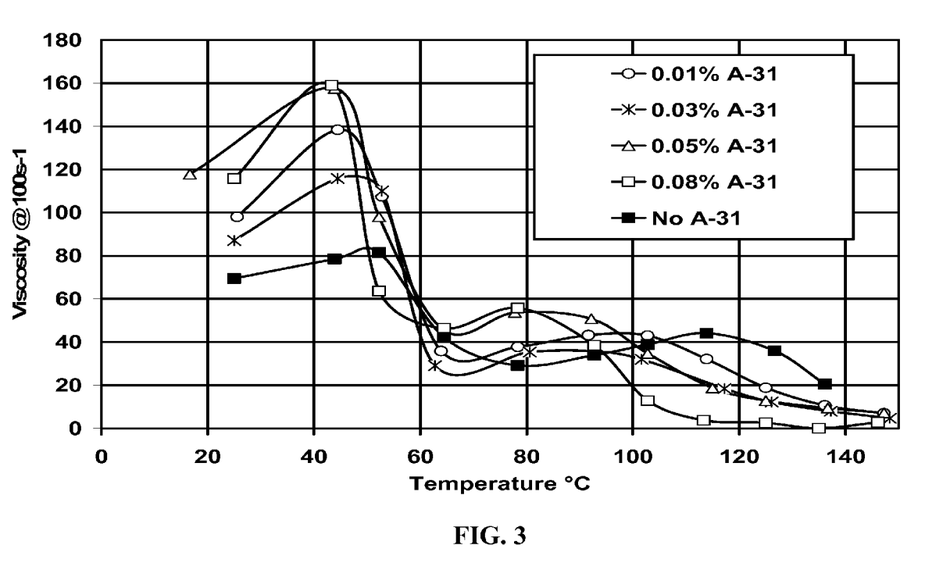
FIG. 3 shows the viscosity of a fluid containing a zwitterionic viscoelastic surfactant and varying concentrations of another rheology enhancer of the invention.

FIGS. 2 and 3 show the fluid viscosity as a function of temperature and additive concentration for fluids containing 3 weight % VES and varying amounts of ANTAROX™ 17-R-2 (A-17; FIG. 2) and ANTAROX™ 31-R-1 (A-31; FIG. 3). It can be seen that below about 95° C., each additive increased the viscosity, and, over most of the temperature range between room temperature and about 95° C., the more additive the higher the viscosity, at least up to an additive concentration of 0.08 weight %. It can also be seen that above about 95° C., the effects were much smaller, but the additives reduced the viscosity slightly, with more additive causing a greater reduction. The maximum amount of additive used in the experiments of example 2 (0.08 wt % of the fluid) was about 6.7% of the weight of surfactant (there was 3 wt % in the fluid of a concentrate containing about 40% active surfactant).

Example 3

Figure 4:
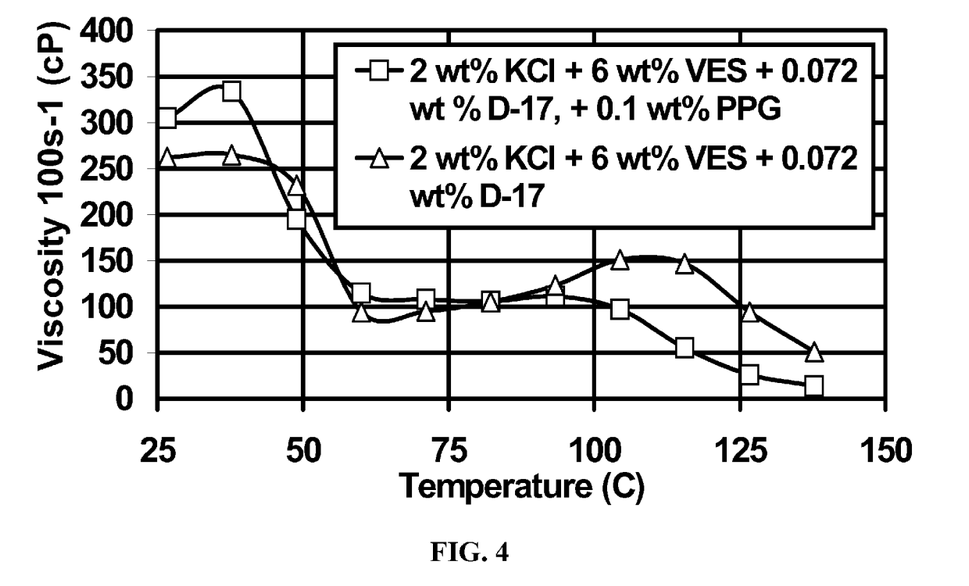
FIG. 4 shows the viscosity as a function of temperature of a fluid containing a zwitterionic viscoelastic surfactant with and without another rheology enhancer of the invention.

Shown in FIG. 4 is the viscosity as a function of temperature of fluids containing 6 wt % VES, from about 0.06 to about 0.72 wt % D-17, and 2 wt % KCl, with and without 0.1 wt % PPG. It can be seen that this 4000 molecular weight polypropylene glycol had some effect on the viscosity. Furthermore, in these experiments, the final shear recovery time of the fluid without the PPG was about 15 seconds while the shear recovery of the fluid with the PPG was almost instantaneous. The maximum amount of additive used in the experiments of example 3 (0.1 wt % of the fluid) was about 4.2% of the weight of surfactant (there was 6 wt % in the fluid of a concentrate containing about 40% active surfactant).

Example 4

Figure 5:
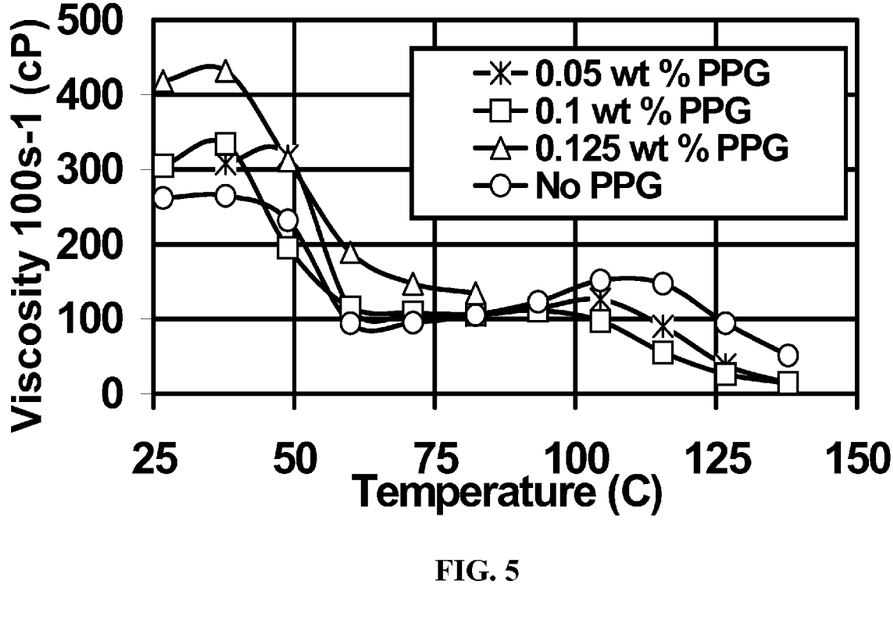
FIG. 5 shows the viscosity as a function of temperature of a fluid containing a zwitterionic viscoelastic surfactant and various concentrations of the same rheology enhancer as used in the experiments of FIG. 4.

FIG. 5 shows the viscosity as a function of temperature of fluids containing 6 wt % VES, 0.072 wt % D-17, 2 wt % KCl, and varying amounts of PPG. Increasing amounts of PPG raised the viscosity at temperatures below 60° C. and decreased the viscosity slightly at temperatures above about 90° C. Note that the viscosities were quite insensitive to the PPG concentration. The maximum amount of additive used in the experiments of example 4 (0.125 wt % of the fluid) was about 5.2% of the weight of surfactant (there was 6 wt % in the fluid of a concentrate containing about 40% active surfactant).

Example 5

In other experiments, for which the data are not shown, a fluid was made containing 6 wt % VES, 0.072 wt % D-17, and 2 wt % KCl. This fluid was mixed in varying amounts (ranging from 10% VES fluid to 50% VES fluid) with a linear gel fluid containing 4.8 kg/L guar and the viscosity was measured from about 25° C. to about 145° C. The viscosities of the mixed fluids was about what would have been expected from the mixing and diluting effects alone; there was no indication that the guar had broken the VES fluid. This is important because the two fluids could come in contact with one another in use, and these experiments show that they are compatible with one another.

We claim:

1. An oilfield treatment method of fracturing, gravel packing or fracturing and gravel packing comprising:
   a. viscosifying a fluid with a viscoelastic surfactant system comprising a viscoelastic surfactant selected from at least one of zwitterionic, amphoteric, and cationic surfactants and mixtures thereof, said fluid having an entangled wormlike micelle structure,
   b. adding to said fluid from about 0.005 to about 0.5 weight % of a rheology enhancer, thereby increasing viscosity of said fluid, and decreasing shear rehealing time of said fluid, said rheology enhancer selected from the group consisting of polypropylene glycols and block copolymers of polypropylene glycol and polyethylene glycol; and
   c. injecting said fluid down a well, further comprising shearing the viscosified fluid to disrupt the micelle structure and then reducing shear for said rehealing.

2. The method of claim 1 wherein said viscoelastic surfactant comprises a zwitterionic surfactant.

3. The method of claim 1 wherein said zwitterionic surfactant comprises a surfactant or mixture of surfactants having the formula:

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

4. The method of claim 1 wherein said zwitterionic surfactant has the betaine structure:

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

5. The method of claim 4 wherein said betaine comprises oleylamidopropyl betaine.

6. The method of claim 4 wherein said betaine comprises erucylamidopropyl betaine.

7. The method of claim 4 wherein said fluid further comprises a co-surfactant.

8. The method of claim 1 wherein said viscoelastic surfactant comprises a cationic surfactant.

9. The method of claim 8 wherein said cationic surfactant comprises a surfactant or mixture of surfactants having the structure:

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds.

10. The method of claim 9 wherein $R_1$ comprises from about 18 to about 22 carbon atoms and may comprise a carbonyl, an amide, or an amine; $R_2$, $R_3$, and $R_4$ comprise from 1 to about 3 carbon atoms, and $X^-$ is a halide.

11. The method of claim 10 wherein $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms.

12. The method of claim 1 wherein said fluid further comprises a member selected from the group consisting of amines, alcohols, glycols, organic salts, chelating agents, solvents, mutual solvents, organic acids, organic acid salts, inorganic salts, oligomers, and mixtures of said members.

13. The method of claim 12 wherein said member is present at a concentration of between about 0.01 and about 10 percent.

14. The method of claim 12 wherein said member is present at a concentration of between about 0.01 and about 1 percent.

15. The method of claim 1 wherein said amphoteric surfactant comprises an amine oxide.

16. The method of claim 15 wherein said amine oxide comprises an amidoamine oxide.

17. The method of claim 1 wherein said rheology enhancer comprises polypropylene glycol.

18. The method of claim 17 wherein said polypropylene glycol has a molecular weight of from about 600 to about 100000.

19. The method of claim 1 wherein said rheology enhancer is selected from the group consisting of block copolymers having the structure PPG-PEG-PPG, PEG-PPG-PEG, and PPG-PEG, wherein PPG is polypropylene glycol and PEG is polyethylene glycol.

20. The method of claim 19 wherein the number of monomeric units in each PPG block is from about 3 to about 1000 and the number of monomeric units in each PEG block is from about 3 to about 1000.

21. The method of claim 20 wherein the number of monomeric units in each PPG block is from about 8 to about 24 and the number of monomeric units in each PEG block is from about 4 to about 12.

22. The method of claim 19 wherein the ratio of PPG repeating units to PEG repeating units is from about 1 to about 2.

23. The method of claim 19 wherein said block copolymer is present at a concentration of from about 0.05 weight % to about 20 weight % of the concentration of the active viscoelastic surfactant.

24. The method of claim 23 wherein said block copolymer is present at a concentration of from about 0.1 weight % to about 10 weight % of the concentration of the active viscoelastic surfactant.

25. The method of claim 19 wherein said block copolymer has a molecular weight of from about 1000 to about 18,000.

26. The method of claim 25 wherein said block copolymer glycol has a molecular weight of from about 2000 to about 4000.

27. The method of claim 19 wherein the block copolymers have terminal groups selected from hydrogen, hydroxyl, and alkyl, wherein the alkyl groups may be linear or branched, and may be saturated or unsaturated, and may contain from one to about 12 carbon atoms, and wherein the terminal groups may be the same or different.

28. The method of claim 1 wherein said fluid further comprises an acid selected from the group consisting of hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and mixtures thereof.

29. The method of claim 1 wherein said rheology enhancer has a structure selected from star, comb, dendritic, brush, graft, and star-branched.

30. The method of claim 1 wherein said shearing occurs in a tubular during said injection and said rehealing occurs upon exiting the tubular.

31. The method of claim 1 wherein the shear rehealing time is less than 15 seconds.

32. The method of claim 30 wherein the shear rehealing time is less than 15 seconds.

* * * * *